(No Model.)
E. E. DURYEA.
APPARATUS FOR LIQUEFYING STARCH UPON STARCH RUNS OR PLANES.
No. 345,418. Patented July 13, 1886.
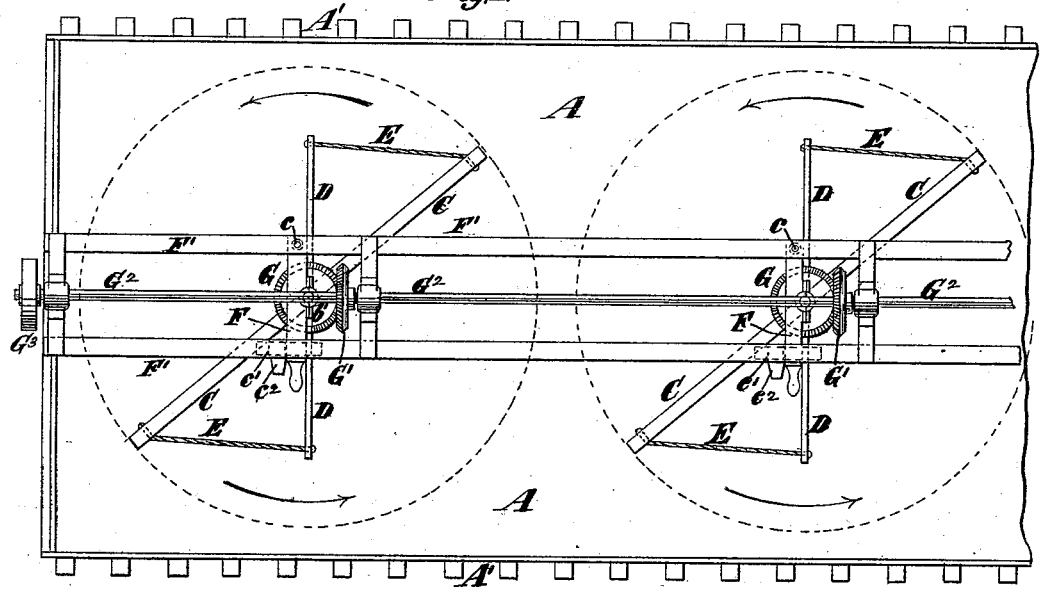
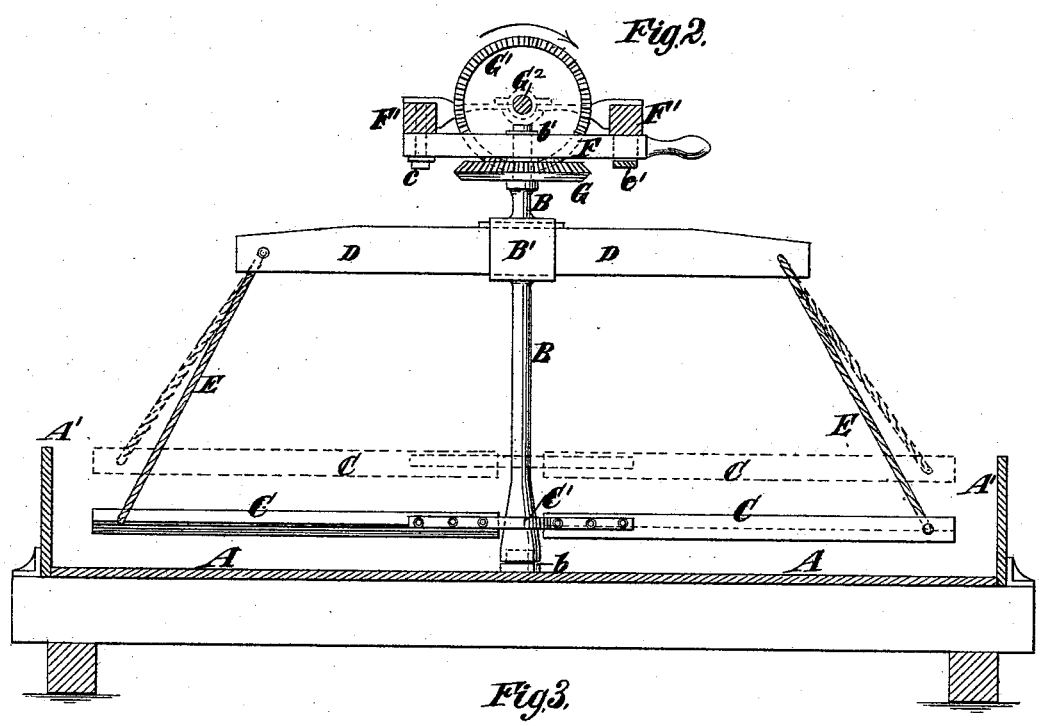
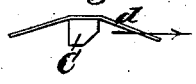
Witnesses
Inventor
Edgar E. Duryea

UNITED STATES PATENT OFFICE.

EDGAR E. DURYEA, OF GLEN COVE, NEW YORK.

APPARATUS FOR LIQUEFYING STARCH UPON STARCH RUNS OR PLANES.

SPECIFICATION forming part of Letters Patent No. 345,418, dated July 13, 1886.

Application filed June 10, 1886. Serial No. 204,777. (No model.)

*To all whom it may concern:*

Be it known that I, EDGAR E. DURYEA, of Glen Cove, in the county of Queens and State of New York, have invented a new and useful Improvement in Apparatus for Liquefying Starch upon Starch Runs or Planes, of which the following is a specification.

In the manufacture of starch by the methods heretofore practiced, and where the starch is deposited upon starch runs, planes, or tables in a comparatively solid and compact mass, it has been usual to break up and remove the starch from the runs by shoveling, and to then transfer the broken and fragmentary starch to separate cisterns or receptacles, where, by the application of water and suitable mechanical appliances, the starch is liquefied and brought to a homogeneous condition. This method of operation not only involves labor and expense in removing the starch deposit from the starch-runs and the subsequent treatment in the breaking cisterns or receptacles, but it also entails expense in the construction and maintenance of the large cisterns or receptacles required and a large amount of room for their occupancy.

In my pending application, Serial No. 204,321, filed June 7, 1886, I have described and claimed a method of liquefying starch deposit while still upon the starch-run, and by the combined action of rubbers or scrapers and water, which is kept in motion by them; and the object of my present invention is to provide a simple form of apparatus to be employed in connection with a starch-run, and by which said method may be successfully carried out.

In order to carry out my improved method I employ, in connection with a starch run or plane, rubbing or scraping arms, which rest upon the starch-deposit on the run or plane, and by their movement keep in motion water above the deposit, and gradually liquefy the starch. These arms may be arranged loose upon upright shafts, so as to rise and fall freely, and to rest and descend by their weight on the starch deposit as it is reduced in thickness, and such rubbing or scraping arms may be moved in circular paths by arms projecting rigidly upon the upright shafts, and connected with the rubbing or scraping arms.

The invention consists in the above-referred to and other novel combinations of parts, which are hereinafter described, and pointed out in the claims.

In the accompanying drawings, Figure 1 is a plan of a portion of a starch-run or starch-plane embodying my invention. Fig. 2 is a transverse vertical section thereof. Fig. 3 is a plan of rubbing or scraping arms, and Fig. 4 is an end view of one of said arms.

Similar letters of reference designate corresponding parts in all the figures.

A designates the floor or bottom, and A' the sides, of a starch-run or starch-plane, which may be constructed in the ordinary manner.

For the purposes of my invention, I prefer to employ a starch-run or starch-plane which is wider than those ordinarily in common use; but my invention may be advantageously applied to the starch-runs or starch-planes in ordinary use.

The essential elements of my invention are rubbers or scrapers for acting upon the surface of the starch deposit, and which are here represented as consisting of arms C, projecting radially from an upright shaft, B. Near its upper end the shaft B is provided with rigid arms D, which may be formed by a cross bar or beam, of wood or metal, secured in a socket, B', on the shaft, and these rigid arms or drivers D, through suitable connections, E, which may be of rope or other material, move the rubbing or scraping arms in circular paths, as shown in Fig. 1, when the upright shaft is turned. Any number of upright shafts, with their rubbing or scraping arms, are arranged at proper intervals in the length of the run, so that the arms C in their travel will pass over the principal portion of the surface of the starch deposit. As here represented, the rubbing or scraping arms C on opposite sides of the shaft B are rigidly connected by means of straps C', so as to rise and fall freely upon the shaft, and the arms C will therefore, when in operation, rest with their weight upon the surface of the starch deposit, and descend gradually as the deposit is reduced in thickness by the combined action of the rubbing or scraping arms and water kept in motion by them. As here represented, the upright shafts B are each supported by a step-bearing, $b$, at the bottom of the run, and by a bearing, $b'$, at their upper end. This bearing $b'$ may be attached to a cross piece or bar, F, carried by horizontal girders or beams F'.

The upright shafts B may be driven by any suitable mechanism, and I have here shown a horizontal shaft, G², to which motion may be transmitted by a driving belt over a pulley, G³, and which, through bevel gear-wheels G' G, transmits motion to the upright shafts.

While starch is being deposited upon the run or plane in the usual way, the rubbing or scraping arms C may be raised out of the way, as shown by dotted lines in Fig. 2, and during such time the shafts B are not driven.

In order to provide for stopping the motion of the upright shafts while depositing starch on the run, I have represented the cross pieces or bars F, to which the upper bearing, b', is secured, as pivoted at one end, c, and laterally movable at the other end in a keeper or hanger c', on the beam or girder F'. In the hanger, with the cross piece or bar F, is a wedge-block, c², which may be inserted on either side of the piece or bar F. When such wedge-block c² is in the position shown in Fig. 1 of the drawings, the gear-wheel G will be held in engagement with the wheel G', which drives it; but when said wedge-block is removed and inserted at the other side of the cross piece or bar F the wheel G will be held out of engagement with the wheel G', and the upright shaft B will be stationary. The same result might be secured by any other mechanical device—such, for example, as a clutch.

In order to interfere as little as possible with the smooth flow of starch-milk over the run while depositing starch, I may make the block or piece, on which is the step-bearing b, wedge-shaped in a reverse direction to the flow of starch-milk over the run. After the deposit of starch has been obtained upon the run, in the usual way, the connections E are slackened, so that the rubbing or scraping arms C will rest by their weight upon the starch deposit, and the run is dammed or stopped either at the end or at intervals in its length, so as to retain a suitable depth of water above the starch deposit. The upright shafts B are then set in operation, and by the combined action of the rubbing or scraping arms C, and the water which is kept in motion by them, the starch-deposit is gradually reduced and liquefied, and as the operation continues the arms C descend, so as to accommodate themselves to the depth of the starch deposit, this operation being continued until the starch deposit is entirely liquefied. It will be observed that the rubbing or scraping arms C, in their travel, cover a large portion of the surface of the starch deposit, and those portions of the starch deposit which are midway between upright shafts B and at the sides of the run or plane will be worn away and liquefied by the action of the water kept in motion by the apparatus, so that without any shoveling or labor and without removing it from the run the starch will all be liquefied. As here represented, the rubbing or scraping arms C have plain lower surfaces or edges destitute of teeth or projections, and when thus formed they act to wear away and liquefy the starch gradually without tearing it up in lumps or fragments.

In order to prevent the spattering of the liquefied starch as the rubbing or scraping arms C may pass over any lumps produced in the operation, I may attach to the arms C shields or guards, as represented at d, in Fig. 4, and in order to enable the arms C to more readily ride over and pass any lumps of starch, I may incline or bevel the lower surfaces of the arms downward and rearward reversely to their direction of rotation, as shown in Fig. 4, the arrow in said figure designating the direction of movement of the arm C.

I do not here claim the improvement in the manufacture of starch, which consists in liquefying it while upon a starch-run or starch-plane, as such method forms the subject of my aforesaid application.

When two or more runs are employed adjacent to each other, one run only might be provided with apparatus similar to that above described, and the starch deposit on the other run or runs might be broken up and shoveled into the run provided with apparatus for liquefying. While this arrangement would not be so desirable as to liquefy the deposit on each run while still upon the run, it would dispense with the use of separate breaking and liquefying cisterns or receptacles, and would therefore necessitate the employing of rubbing or scraping devices acting in connection with water for liquefying starch while on a run.

What I claim as my invention, and desire to secure by Letters Patent, is—

1. The combination, with a starch-run or starch-plane, of rubbing or scraping devices for acting with water to liquefy starch while on the run or plane, substantially as and for the purpose herein described.

2. The combination, with a starch-run or starch-plane, of an upright rotary shaft provided with rubbers or scrapers for acting with water upon the deposit of starch to liquefy the starch while on the run or plane, substantially as and for the purpose herein described.

3. The combination, with a starch-run or starch-plane, of rotary rubbers or scrapers for acting with water upon the deposit of starch to liquefy the starch while on the run or plane, and which are vertically movable to provide for raising them out of the way when depositing starch upon the run or plane, substantially as and for the purpose herein described.

4. The combination, with a starch-run or starch-plane, of rotary rubbers or scrapers for acting with water upon the deposit of starch to liquefy the starch while on the run or plane, and which are free to rise and fall as they rotate, so as to bear on the starch deposit by their weight as the depth of the starch deposit is reduced, substantially as and for the purpose herein described.

5. The combination, with a starch-run or starch-plane, of an upright shaft and rubbing or scraping arms carried by the shaft for acting with water upon the starch deposit to liquefy the starch while on the run or plane, and which are free to rise and fall on said shaft to accommodate themselves to the level of the starch deposit, substantially as herein described.

6. The combination, with a starch-run or starch-plane, of an upright shaft and arms projecting rigidly therefrom to serve as drivers, rubbing or scraping arms loose upon said shaft, and connections between the rigid arms or drivers and the loose arms, whereby the latter are carried round by the shaft and caused to act with water on the starch deposit to liquefy the starch while on the run or plane, substantially as herein described.

7. The combination, with a starch-run or starch-plane, of a series of rotary arms for acting with water upon the starch deposit to liquefy the starch while upon the run or plane, the lower bearing-surfaces of said arms being inclined downward and rearward reversely to their direction of movement, substantially as herein described.

8. The combination, with a starch-run or starch-plane, of a series of rotary arms for acting with water upon the starch deposit to liquefy the starch while upon the run or plane, the lower or bearing surfaces of said arms being plain and destitute of projections, substantially as herein described.

9. The combination, with a starch-run or starch-plane, of a series of rotary arms for acting with water upon the starch deposit to liquefy the starch while upon the run or plane, and shields or aprons projecting from said arms to prevent the spatter of the liquefied starch as the arms pass over lumps of starch, substantially as herein described.

10. The combination, with a starch-run or starch-plane, of upright shafts each supported by a step at the bottom of the run or plane, and provided with arms to act with water on the starch deposit to liquefy the starch while on the run or plane, a driving-shaft and gearing through which the upright shafts are driven, and movable bearings for the upper ends of the upright shafts to provide for disengaging them from their driving mechanism, substantially as herein described.

EDGAR E. DURYEA.

Witnesses:
C. HALL,
FREDK. HAYNES.